(12) United States Patent
Boydston et al.

(10) Patent No.: US 12,195,581 B2
(45) Date of Patent: Jan. 14, 2025

(54) COMPOSITIONS FOR STABILIZING METAL-FREE RING-OPENING METATHESIS POLYMERIZATION AND RELATED METHODS

(71) Applicant: Wisconsin Alumni Research Foundation, Madison, WI (US)

(72) Inventors: Andrew Jackson Boydston, Middleton, WI (US); Xuejin Yang, San Jose, CA (US); Rachel Tritt, Middleton, WI (US); Margaret Tetzloff, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 254 days.

(21) Appl. No.: 17/851,312

(22) Filed: Jun. 28, 2022

(65) Prior Publication Data
US 2023/0002546 A1 Jan. 5, 2023

Related U.S. Application Data

(60) Provisional application No. 63/216,100, filed on Jun. 29, 2021.

(51) Int. Cl.
| | | |
|---|---|---|
| *C08G 61/08* | (2006.01) | |
| *C08G 61/12* | (2006.01) | |
| *C08K 5/05* | (2006.01) | |
| *C08K 5/1545* | (2006.01) | |

(52) U.S. Cl.
CPC ............ *C08G 61/08* (2013.01); *C08G 61/12* (2013.01); *C08K 5/05* (2013.01); *C08K 5/1545* (2013.01); *C08G 2261/22* (2013.01); *C08G 2261/3324* (2013.01); *C08G 2261/334* (2013.01); *C08G 2261/418* (2013.01); *C08G 2261/76* (2013.01)

(58) Field of Classification Search
CPC .................................. C08G 61/08; C08K 5/05
See application file for complete search history.

(56) References Cited

U.S. PATENT DOCUMENTS

| | | | |
|---|---|---|---|
| 10,273,327 B2 | 4/2019 | Boydston et al. | |
| 2017/0240695 A1* | 8/2017 | Boydston ............. | C08G 61/125 |

OTHER PUBLICATIONS

Samak, Journal of Molecular Catalysis A: Chemical 160 (2000) 13-21 (Year: 2000).*
Goetz, ACS Macro Letters, vol. 5, Issue 5, May 17, 2016, p. 552-640 (Year: 2016).*
Goetz, Adam E., et al. "Expanded functionality of polymers prepared using metal-free ring-opening metathesis polymerization." ACS Macro Letters 5.5 (2016): 579-582.

(Continued)

Primary Examiner — Robert C Boyle
(74) Attorney, Agent, or Firm — Bell & Manning, LLC

(57) ABSTRACT

A reactant composition for forming a polymer via metal-free ring-opening metathesis polymerization may comprise a stabilizer, a stabilizing reactant comprising a stabilizing moiety covalently bound to a reactant moiety, or both; wherein the stabilizer is a halogenated alcohol and the stabilizing moiety is derived from a halogenated alcohol. The reactant composition further comprises a strained cyclic unsaturated monomer; an initiator; a mediator; and optionally, one or more of a co-monomer, a crosslinker, and a chain transfer agent.

11 Claims, 16 Drawing Sheets

Ethyl-1-propenyl ether (EPE) 2a, pyrillium 3a

With and without solvent (dichloromethane, DCM)
With and without stabilizer (hexafluoroisopropanol, HFIP)
Blue LED light

1

(56) References Cited

OTHER PUBLICATIONS

Yang, Xuejin, et al. "An Ion-Pairing Approach to Stereoselective Metal-Free Ring-Opening Metathesis Polymerization." *Angewandte Chemie* 133.25 (2021): 14071-14077.

X. Yang, L. Murphy, F. M. Haque, S. M. Grayson and A. Boydston, Polym. Chem., 2021, DOI: 10.1039/D1PY00191D. pp. 1-8.

Kensy, Victoria K., et al. "Molecular Weight Control via Cross Metathesis in Photo-Redox Mediated Ring-Opening Metathesis Polymerization." *Angewandte Chemie* 132.23 (2020): 9159-9164.

Lu, Pengtao, and Andrew J. Boydston. "Integration of metal-free ring-opening metathesis polymerization and organocatalyzed ring-opening polymerization through a bifunctional initiator." *Polymer Chemistry* 10.23 (2019): 2975-2979.

Lu, Pengtao, Nasser M. Alrashdi, and Andrew J. Boydston, "Bidirectional metal-free ROMP from difunctional organic initiators." *Journal of Polymer Science Part A: Polymer Chemistry* 55.18 (2017): 2977-2982.

Krappitz, Tim, et al. "Hybrid photo-induced copolymerization of ring-strained and vinyl monomers utilizing metal-free ring-opening metathesis polymerization conditions." *Journal of the American Chemical Society* 141.42 (2019): 16605-16609.

\* cited by examiner

CAS: 196314-61-1, commercial available
Macromolecules 2002, 35, 6539-6549

COMPOSITIONS FOR STABILIZING METAL-FREE RING-OPENING METATHESIS POLYMERIZATION AND RELATED METHODS

CROSS REFERENCE TO RELATED APPLICATIONS

The present application claims priority to U.S. Provisional Patent aapplication No. 63/216,100 that was filed Jun. 29, 2021, the entire contents of which are incorporated herein by reference.

REFERENCE TO GOVERNMENT RIGHTS

This invention was made with government support under W911NF-17-2-0199 and W911NF-20-2-0164 awarded by the ARMY/ARL and under 2002886 awarded by the National Science Foundation. The government has certain rights in the invention.

BACKGROUND

Ring-opening metathesis polymerization (ROMP) is a well-established technique used to produce a variety of useful polymers. ROMP is initiated by transition metal complexes such as Ru, Mo, and W alkylidine complexes. Metal-free ROMP (MF-ROMP) is an alternative technique that addresses the problem of expensive metal initiators and metal-contamination of the resulting polymers. For example, photoredox mediated MF-ROMP uses organic redox mediators and enol ether initiators in the polymerization process.

SUMMARY

Provided are stabilizers and stabilizing reactants for use in MF-ROMP. The polymerization mechanism of MF-ROMP involves the generation of radical cationic active chain ends, which are susceptible to deactivation. For example, photoredox mediated MF-ROMP can be achieved via single electron oxidation of an enol ether initiator with a pyrylium photoredox mediator to ultimately generate radical cationic active chain ends. Without wishing to be bound by any particular theory, it is believed that such radical cationic active chain ends may exist as part of a radical-ion pair with the counteranion of the pyrylium salt and the pyranyl radical. The present disclosure is related to the discovery of certain stabilizers that greatly enhance monomer conversion via MF-ROMP. It is believed that these stabilizers facilitate separation of this radical-ion pair to suppress back electron transfer and deactivation in favor of chain propagation. In the present disclosure, stabilization of the MF-ROMP technique is achieved by including these stabilizers as additional components in MF-ROMP reactant compositions or by including stabilizing moieties on reactants (thereby providing stabilizing reactants) in reactant compositions such as monomers and/or chain transfer agents.

In embodiments, a reactant composition for forming a polymer via metal-free ring-opening metathesis polymerization comprises a stabilizer, a stabilizing reactant comprising a stabilizing moiety covalently bound to a reactant moiety, or both; wherein the stabilizer is a halogenated alcohol and the stabilizing moiety is derived from a halogenated alcohol. The reactant composition further comprises a strained cyclic unsaturated monomer; an initiator; a mediator; and optionally, one or more of a co-monomer, a crosslinker, and a chain transfer agent.

In embodiments a reactant composition for forming a polymer via metal-free ring-opening metathesis polymerization comprises one or more of: a stabilizer having Formula I

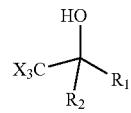

wherein $R_1$ and $R_2$ are independently selected from a hydrogen, an alkyl group, a phenyl group, and an alkenyl group and X is a halogen; a stabilizing monomer having Formula II, $HOCR_3(CX_3)-(CH_2)_n-M$, wherein $R_3$ is hydrogen or an alkyl group; X is a halogen; n is an integer from 2 to 9; and M is a strained cyclic unsaturated monomer; and a stabilizing chain transfer agent having Formula III, wherein the stabilizing chain transfer agent has Formula III, $R_3C(OH)CX_3-(CH_2)_n-CH_2=CH_2$, wherein $R_3$ is hydrogen or an alkyl group; X is a halogen; and n is an integer from 2 to 9. The reactant composition further comprises a strained cyclic unsaturated monomer; an initiator; a mediator; and optionally, one or more of a co-monomer, a crosslinker, and a chain transfer agent.

Methods of using the reactant compositions to form a polymer are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 12 shows the structures of illustrative stabilizers. However, the compound 1,1,1-trifluoro-2-(trifluoromethyl)-4-penten-2-ol may be considered to be an illustrative stabilizing chain transfer agent.

DETAILED DESCRIPTION

Figure 1:
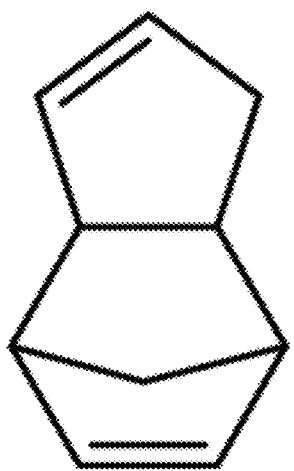
FIG. 1 shows the structure of an illustrative strained cyclic unsaturated monomer.

Provided are stabilizers and stabilizing reactants for use in MF-ROMP. Related methods are also provided.

MF-ROMP itself is a known technique. (See, e.g., U.S. Pat. No. 10,273,327; Goetz, Adam E., et al. *ACS Macro Letters* 5.5 (2016): 579-582; Lu, Pengtao, et al. *Journal of Polymer Science Part A: Polymer Chemistry* 55.18 (2017): 2977-2982; Krappitz, Tim, et al. *Journal of the American Chemical Society* 141.42 (2019): 16605-16609; Lu, Pengtao, et al., *Polymer Chemistry* 10.23 (2019): 2975-2979; Kensy, Victoria K., et al. *Angewandte Chemie International Edition* 59.23 (2020): 9074-9079; Yang, Xuejin, et al. *Angewandte Chemie International Edition* (2021); Yang, Xuejin, et al. *Polymer Chemistry* (2021): Ogawa, Kelli, et al. *Journal of the American Chemical Society* 137.4 (2015): 1400-1403; Goetz, Adam, E. et al. *Journal of the American Chemical Society* 137.24 (2015): 7572-7575; and Lu, Pengtao, et al. *Accounts of Chemical Research* 53.10 (2020): 2325-2335. Each of these are hereby incorporated by reference in their entirety.) Briefly, formation of a polymer via MF-ROMP involves exposing reactants such as a strained cyclic unsaturated monomer, an initiator, and a mediator to conditions sufficient to induce ring-opening of the strained cyclic unsaturated monomer and chain propagation to form a polymer therefrom. In conventional MF-ROMP, a solvent such as dichloromethane is necessary since otherwise, polymerization rates are negligible. Other reactants may be included such as co-monomers, crosslinkers, and chain transfer agents. The conditions to induce polymerization include application of some form of energy, e.g., irradiation with light. When light is used, the mediator may be a photoredox mediator and the polymerization may be referred to as photoredox mediated MF-ROMP.

The present disclosure provides a modified MF-ROMP technique involving the use of stabilizers, stabilizing reactants, or both. The stabilizers may be added to a reactant composition comprising a strained cyclic unsaturated monomer, an initiator, a mediator, and optionally, one or more of a co-monomer, a crosslinker, and a chain transfer agent. The stabilizing reactants may be included in the reactant composition in addition to, or in place of, other reactants in the reactant composition such as the strained cyclic unsaturated monomer and/or the chain transfer agent. A stabilizing reactant comprises a stabilizing moiety covalently bound to a reactant moiety, e.g., a monomeric moiety or a chain transfer moiety. A solvent may be included in any of the reactant compositions. However, in embodiments, no solvent is included. That is, use of the present stabilizers and/or stabilizing reactants enables solvent-free MF-ROMP, i.e., true bulk polymerization. The stabilizers, stabilizing reactants, and other components of the reactant composition are described in detail below.

Stabilizers

The present stabilizers are small molecules that are both strong hydrogen bond donors and poor nucleophiles. They are also generally highly polar. These properties are believed to facilitate separation of the radical-ion pairs formed between radical cationic active chain ends and counteranions from the mediator as described above. In embodiments, the stabilizer is a halogenated alcohol, which refers to an alcohol wherein one or more carbon-hydrogen bonds are replaced by carbon-halogen bonds. The halogenated alcohol may be a primary, secondary, or tertiary halogenated alcohol. The halogenated alcohol may have various numbers of carbon atoms, e.g., from 2 to 20 carbon atoms. This includes, e.g., from 2 to 18, from 2 to 16, from 2 to 14, from 2 to 12, from 2 to 10, from 2 to 8, and from 2 to 6. The halogenated alcohol may have a single hydroxyl group (monohydric) or more than one hydroxyl group (polyhydric), e.g., 2 (diol), 3 (triol), etc. The halogenated alcohol may have various degrees of halogenation, which refers to the number of carbon-hydrogen bonds replaced by carbon-halogen bonds. Generally, the degree of halogenation is quite high. Any halogen may be used, including combinations of different halogens. In embodiments, the halogen is F and the halogenated alcohol is a fluorinated alcohol. In embodiments, the fluorinated alcohol is a secondary fluorinated alcohol comprising at least one hydroxyl group. In embodiments, the fluorinated alcohol is a tertiary fluorinated alcohol comprising at least one hydroxyl group.

In embodiments, the stabilizer/halogenated alcohol has Formula I:

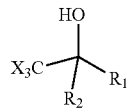

wherein $R_1$ and $R_2$ are independently selected from a hydrogen, an alkyl group, a phenyl group, and an alkenyl group and X is a halogen (e.g., F, Cl, Br, or I). The alkyl group may be a linear or branched alkyl group having from 1 to 12 carbons, e.g., 1 to 10, 1 to 8, 1 to 6, or 1 to 4. Similarly, the alkenyl group may be a linear or branched alkenyl group having from 1 to 12 carbons, e.g., 1 to 10, 1 to 8, 1 to 6, or 1 to 4. A carbon-carbon double bond of the alkenyl group may be at the terminal position of the alkenyl group. The phenyl group refers to a $C_6H_5$ group. Each of the alkyl group, the phenyl group, and the alkenyl group may be unsubstituted or substituted. Unsubstituted means that the group contains no heteroatoms. Substituted means one or more bonds to a carbon(s) or hydrogen(s) are replaced by a bond to non-hydrogen and non-carbon atoms. However, a substituted benzyl group encompasses a bond(s) to a hydrogen(s) replaced by a bond(s) to a substituted or unsubstituted alkyl group. Non-hydrogen and non-carbon atoms may include, e.g., a halogen atom; an oxygen atom; a sulfur atom; a nitrogen atom; and a phosphorus atom.

In embodiments of Formula I, one or more of the following may apply: X is F; $R_1$ is hydrogen, $CF_3$, or $CH_3$; and $R_2$ is hydrogen, $CF_3$, $CH_3$, a phenyl group, a linear alkenyl group, or a branched alkyl group. In embodiments of Formula I, at least one of $R_1$ and $R_2$ is $CF_3$ or $CH_3$.

In embodiments, the stabilizer/halogenated alcohol has Formula IA, wherein X and $R_2$ have been defined above with respect to Formula I:

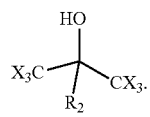

In embodiments of Formula IA, one or more of the following may apply: X is F; and $R_2$ is hydrogen, $CF_3$, $CH_3$, a phenyl group, a linear alkenyl group, or a branched alkyl group.

Figure 12:
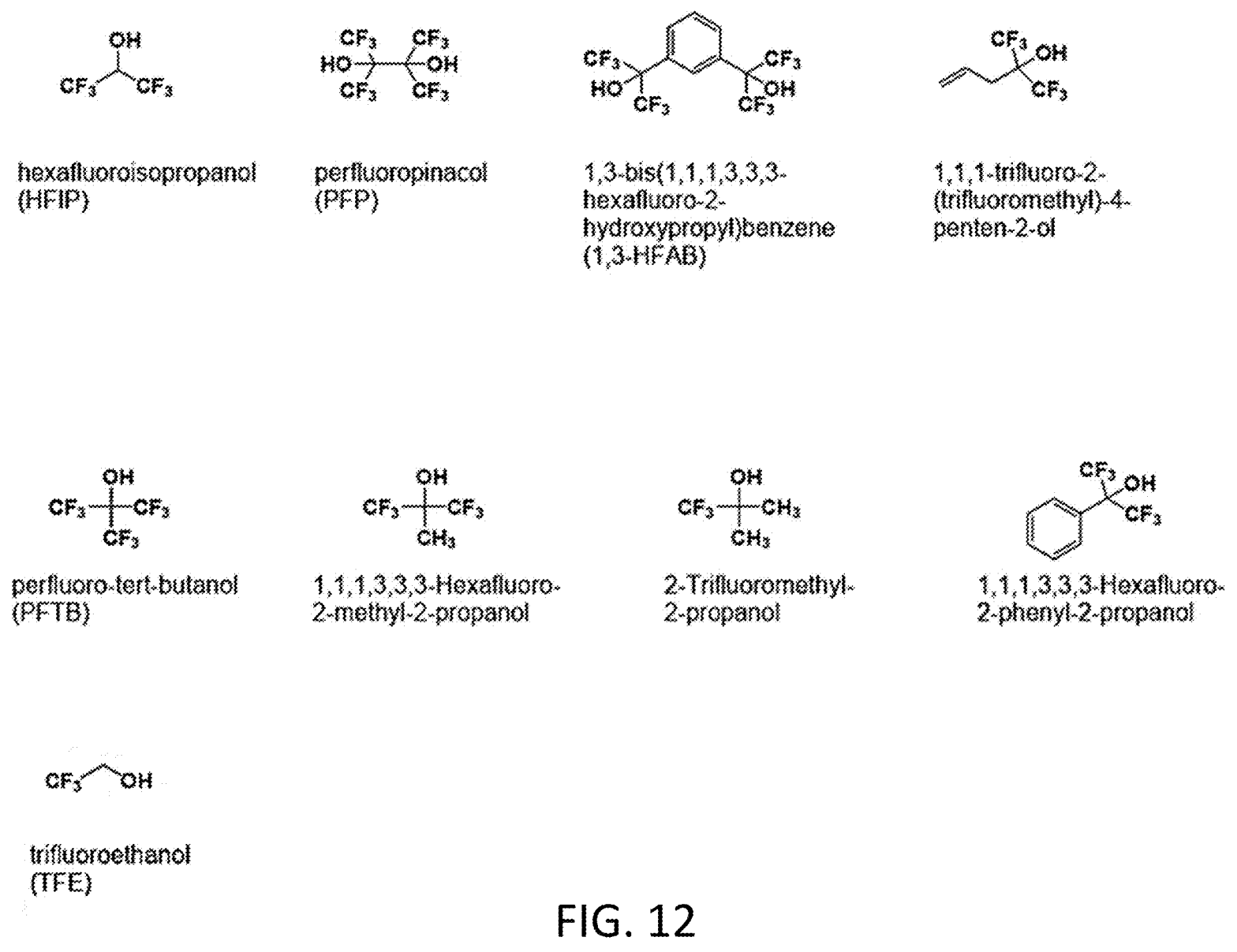

Illustrative species of secondary and tertiary fluorinated alcohols are shown in FIG. 12, including hexafluoroisopropanol (HFIP). However, the compound 1,1,1-trifluoro-2-(trifluoromethyl)-4-penten-2-ol may be considered to be an illustrative stabilizing chain transfer agent. These may be obtained from commercial sources or synthesized using known techniques.

As noted above, the stabilizers may be added as an additional component of any of the disclosed reactant compositions. When present, the stabilizers may be used in various amounts. Illustrative amounts include from 2.5 to 10 equivalents (eq.) relative to the initiator. This includes, e.g., from 3 to 8 eq. and from 5 to 7 eq. A single type of stabilizer or a combination of different types of stabilizers may be used. When different types of stabilizers are used, the amounts refer to the total amount of stabilizers.

Strained Cyclic Unsaturated Monomer

The reactant compositions comprise a strained cyclic unsaturated monomer. Such monomers refer to cyclic monomers having ring strain due to angles in the ring being compressed or expanded compared to their optimal values. In embodiments, the strained cyclic unsaturated monomer is a strained cycloalkene such as norbornene, cyclobutene, cyclooctene, cyclodecene, cyclododecatriene. Other illustrative strained cyclic unsaturated monomers include dicyclopentadiene (DCPD) 1 as shown in FIG. 1; dihydro-DCPD; and tetracyclododecene. However, any of the strained cyclic unsaturated monomers described in the references listed above, including U.S. Pat. No. 10,273,327, may be used. If applicable, either isomer of the strained cyclic unsaturated monomer may be used, i.e., the endo isomer, the exo isomer, or both may be used. If no specific isomer is specified, it is understood that either or both isomers are encompassed. Various amounts of the strained cyclic unsaturated monomer may be used. Illustrative amounts include from 10 to 50 eq. relative to the initiator. This includes, e.g., from 15 to 45 eq. and from 20 to 40 eq. A single type of strained cyclic unsaturated monomer or a combination of different types of strained cyclic unsaturated monomers may be used. When different types of strained cyclic unsaturated monomers are used, the amounts refer to the total amount of strained cyclic unsaturated monomers.

Initiator

Figure 2:
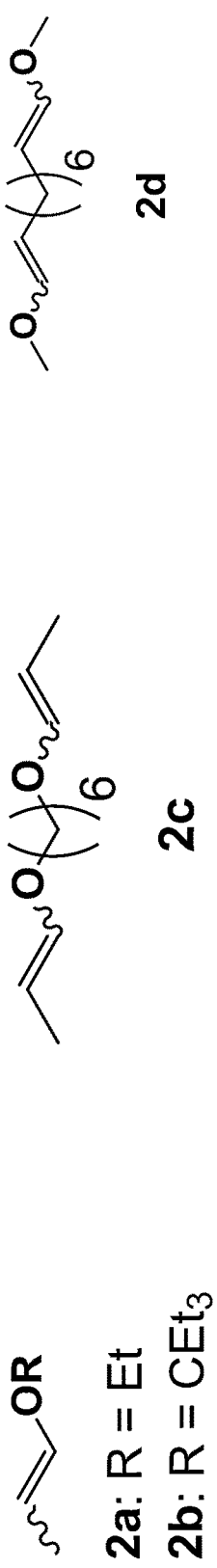
FIG. 2 shows the structures of illustrative initiators.
Figure 2:
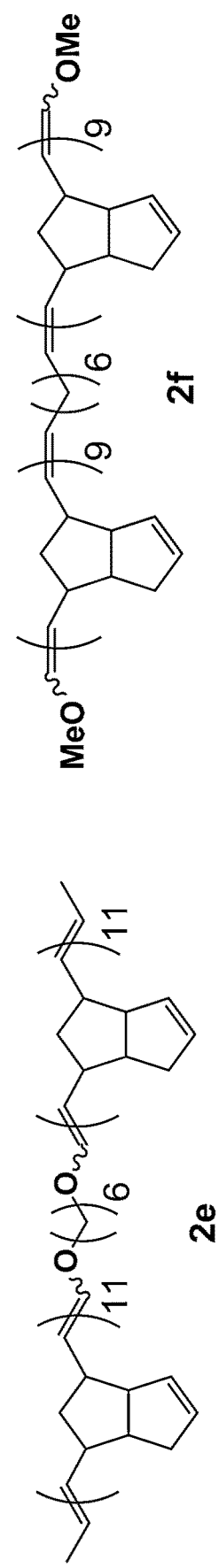

The reactant compositions comprise an initiator, which is a compound capable of initiating polymerization, in embodiments, by forming a radial cation. Enol ethers, including vinyl ethers, may be used as the initiator. Any of the initiators described in the references listed above, including U.S. Pat. No. 10,273,327, Lu et al. 2017, and Lu et al. 2019 may be used. Illustrative initiators 2a-2f are shown in FIG. 2. Difunctional initiators (e.g., initiators 2c, 2d) and macro-initiators (e.g., initiators 2e, 2f) may be used. The use of "difunctional" refers to the presence of two moieties capable of forming a polymer. The use of "macro" refers to the initiator itself being an oligomer or polymer. Various amounts of the initiator may be used. A single type of initiator or a combination of different types of initiators may be used. When different types of initiators are used, the amounts refer to the total amount of initiators.

Mediator

Figure 3:
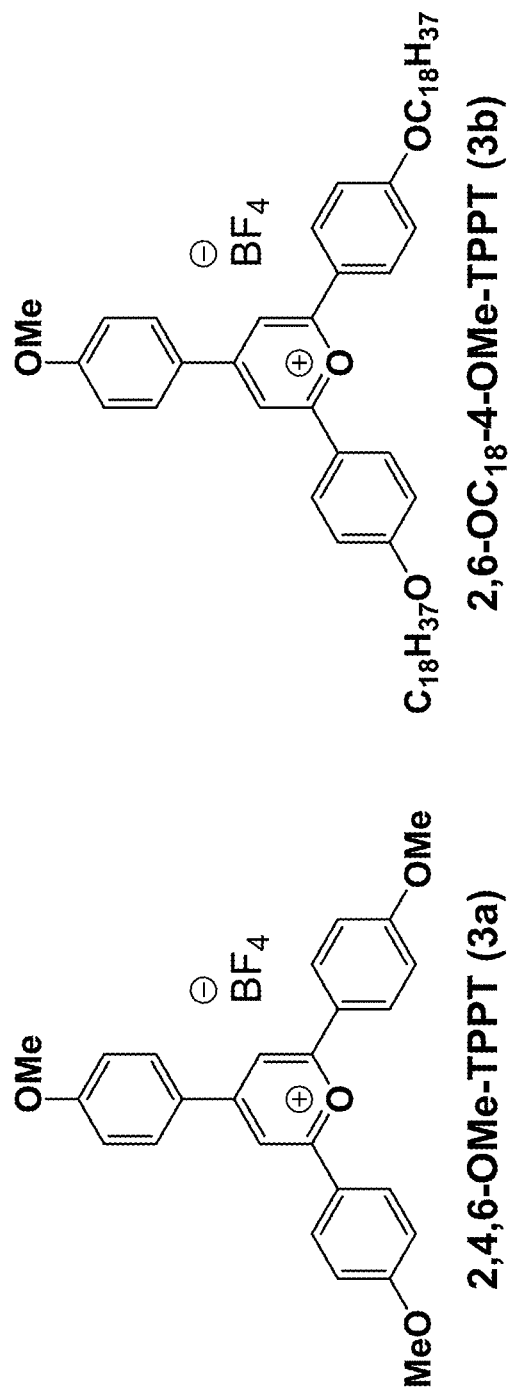
FIG. 3 shows the structure of illustrative photoredox mediators.

The reactant compositions comprise a mediator, which is a compound capable of participating (including by accelerating electron transfer reactions) including those involving any of the disclosed initiators. The mediator may be a photoredox mediator which is activated by light. Pyrylium salts may be used as the mediator (photoredox mediator). Any of the mediators described in the references listed above, including U.S. Pat. No. 10,273,327, may be used. Illustrative pyrylium salts 3a, 3b are shown in FIG. 3. Various amounts of the mediator may be used. Illustrative amounts include from 0.01 to 0.05 eq. relative to the initiator. This includes, e.g., from 0.01 to 0.03 and from 0.02 to 0.04. A single type of mediator or a combination of different types of mediators may be used. When different types of mediators are used, the amounts refer to the total amount of mediators.

Co-Monomer

The reactant compositions may further comprise a co-monomer. The co-monomer refers to a monomer other than a strained cyclic unsaturated monomer and which has a single polymerizable group such that the monomer is capable of becoming incorporated into a polymer formed from any of the disclosed reactant compositions. Vinyl monomers may be used as co-monomers. (Meth)acrylates may be used as the vinyl monomers. Any of the (meth) acrylates described in the references listed above, including Krappitz et al. 2019, may be used. When present, various amounts of the co-monomer may be used. Illustrative amounts include from 5 to 25 eq. relative to the initiator. This includes, e.g., from 5 to 20 eq. and from 10 to 20 eq. A single type of co-monomer or a combination of different types of co-monomers may be used. When different types of co-monomers are used, the amounts refer to the total amount of co-monomers.

Crosslinker

Figure 4:
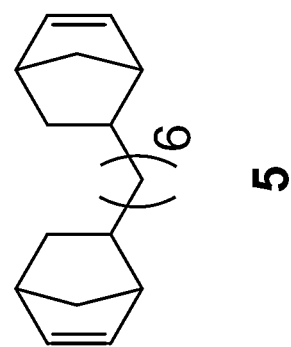
FIG. 4 shows the structure of illustrative crosslinkers.
Figure 4:
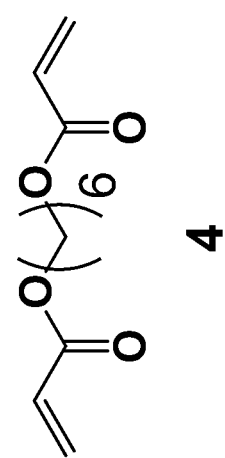

The reactant compositions may further comprise a crosslinker. The crosslinker refers to compounds having two or more reactive groups capable of reacting with a polymer formed from any of the disclosed reactant compositions post-polymerization. The crosslinker also refers to a crosslinking monomer having two or more polymerizable groups such that the crosslinking monomer is capable of becoming incorporated into a polymer, including by covalently linking individual polymer chains, formed from any of the disclosed reactant compositions. Any of the crosslinkers described in the references listed above, including U.S. Pat. No. 10,273, 327, may be used. Illustrative crosslinkers 4, 5 are shown in FIG. 4. When present, various amounts of the crosslinker may be used. Illustrative amounts include from 1 to 10 eq. relative to the initiator. This includes, e.g., from 2 to 8 eq. and from 3 to 5 eq. A single type of crosslinker or a combination of different types of crosslinkers may be used. When different types of crosslinkers are used, the amounts refer to the total amount of crosslinkers.

Chain Transfer Agent

The reactant compositions may further comprise a chain transfer agent, which refers to compounds capable of reacting with a radical site of a propagating polymer chain formed from any of the disclosed reactant compositions to interrupt chain growth. Terminal olefins may be used as the chain transfer agent. The terminal olefin may have from 3 to 20 carbon atoms. This includes, e.g., from 3 to 18, from 3 to 16, from 3 to 14, from 3 to 12, from 3 to 10, from 3 to 8, and from 3 to 6. The terminal olefin may be a linear terminal olefin. Any of the terminal olefins described in the references listed above, including Kensy et al. 2020, may be used. When present, various amounts of the chain transfer agent may be used. Illustrative amounts include from 5 to 50 eq. relative to the initiator. This includes, e.g., from 10 to 40 eq. and from 20 to 30 eq. A single type of chain transfer agents or a combination of different types of chain transfer agents may be used. When different types of chain transfer agents are used, the amounts refer to the total amount of chain transfer agent.

Solvent

As noted above, the reactant composition may further comprise a solvent. Illustrative solvents include dichloromethane, acetonitrile, toluene, nitromethane, and combinations thereof. When included, the amount of solvent may be selected to dissolve the selected reactants. However, in embodiments, the reactant composition is free of (i.e., does not comprise) any of the solvents listed in this section.

Stabilizing Reactants

As noted above, stabilizing reactants may be included in the reactant composition. A stabilizing reactant comprises a stabilizing moiety covalently bound to a reactant moiety. The stabilizing reactant may be considered to be a reactant (e.g., any of the reactants described herein) that has been functionalized with any of the disclosed stabilizers to provide the stabilizing moiety. When any of the reactants described herein are functionalized as such, they may be referred to as stabilizing reactants. By contrast, unfunctionalized reactants are referred to herein without using the "stabilizing" modifier. In embodiments, the stabilizing moiety of the stabilizing reactant is derived from a halogenated alcohol, including any of the halogenated alcohols described herein. The term "derived" is used since at least one of the bonds of the halogenated alcohol is replaced by a covalent linkage to the reactant moiety. This covalent linkage may be a single covalent bond or a covalent linkage provided by a linking moiety, e.g., an alkyl chain. In embodiments, the stabilizing moiety is derived from a fluorinated alcohol such as a secondary fluorinated alcohol comprising at least one hydroxyl group. In embodiments, the stabilizing moiety is derived from hexafluoroisopropanol.

Figure 5:
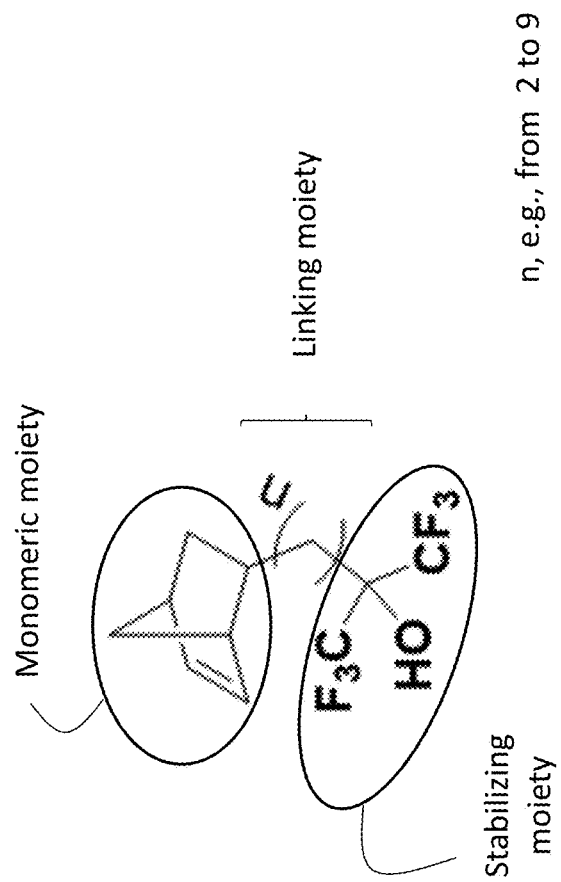
FIG. 5 shows the structure of an illustrative stabilizing monomer.
Figure 13A:
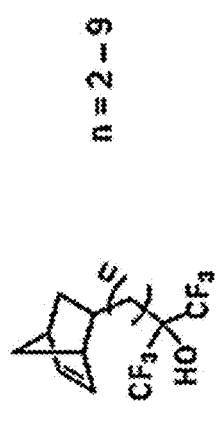
FIGS. 13A-13B shows illustrative reaction schemes for synthesizing the stabilizing monomer of FIG. 5.
Figure 13A:
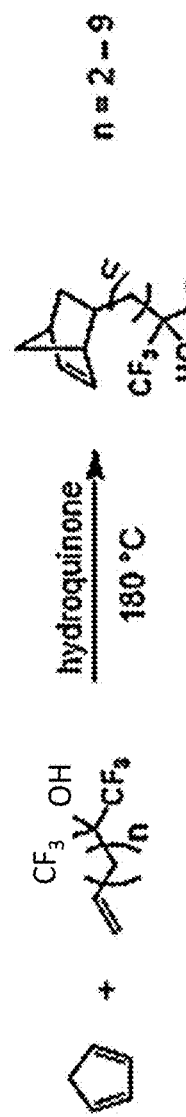
Figure 13B:

The reactant moiety is derived from a corresponding reactant, including any of the reactants described herein. However, in embodiments, the reactant from which the reactant moiety is derived from a monomeric moiety or a chain transfer moiety. Again, the term "derived" is used since at least one of the bonds of the reactant is replaced by the covalent linkage described above. Regarding the monomeric moiety, this may be derived from any of monomers described herein. However, in embodiments, the monomeric moiety is derived from a strained cyclic unsaturated monomer such as a strained cycloalkene. In embodiments, the monomeric moiety is derived from norbornene. FIG. 5 shows an illustrative stabilizing norbornene monomer comprising a stabilizing moiety, a linking moiety, and a monomeric moiety. As shown in FIG. 5, n may range from 2 to 9. This also includes n being 3, 4, 5, 6, 7, and 8. Known synthetic techniques may be used to form such stabilizing monomers. For example, FIGS. 13A-13B show two illustrative reaction schemes for synthesizing the stabilizing monomer of FIG. 5.

In embodiments, the stabilizing reactant is a stabilizing monomer having Formula II, $HOCR_3(CX_3)$—$(CH_2)_n$-M. In Formula II, $R_3$ is hydrogen or an alkyl group; X is a halogen; n is an integer from 2 to 9; and M is any of the disclosed strained cycloalkenes. In embodiments of Formula II, one or more of the following may apply: $R_3$ is hydrogen, $CH_3$, or $CX_3$; X is F; and M is norbornene.

Figure 6:
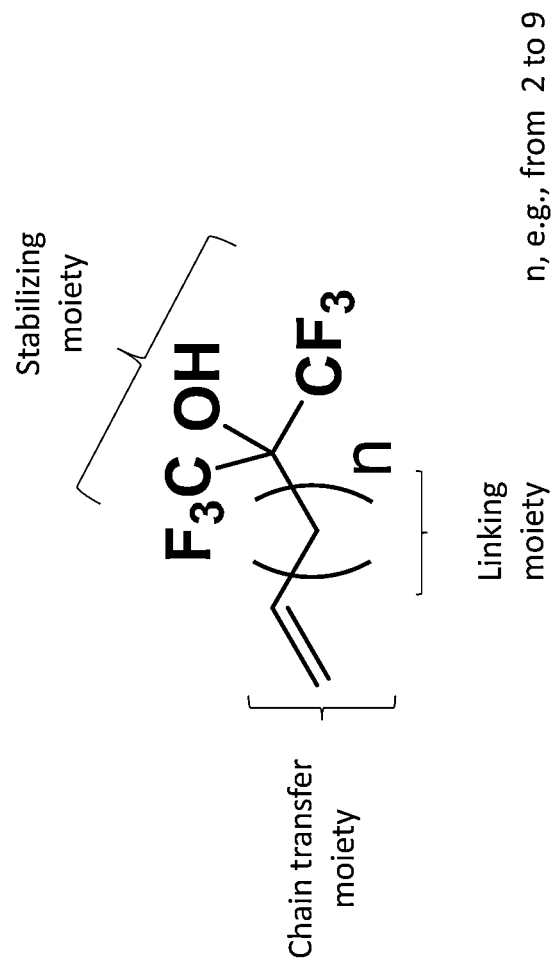
FIG. 6 shows the structure of an illustrative stabilizing chain transfer agent.
Figure 14A:
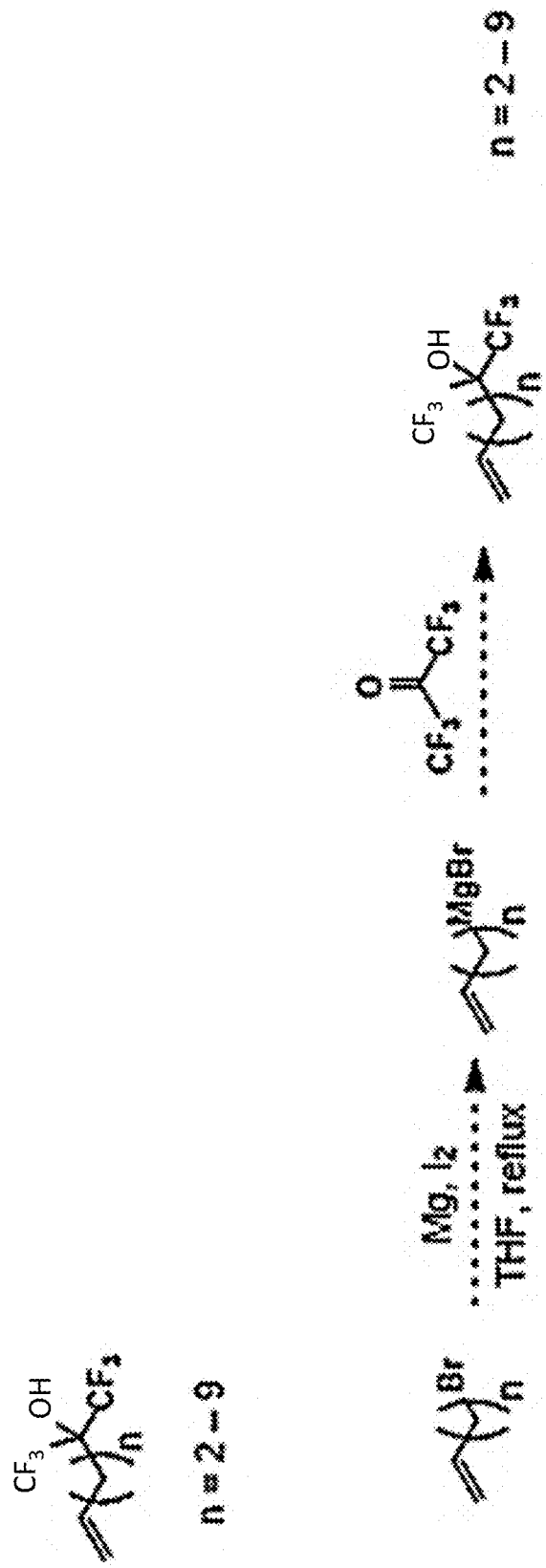
FIG. 14A shows an illustrative reaction scheme for synthesizing the stabilizing chain transfer agent of FIG. 6.
Figure 14B:
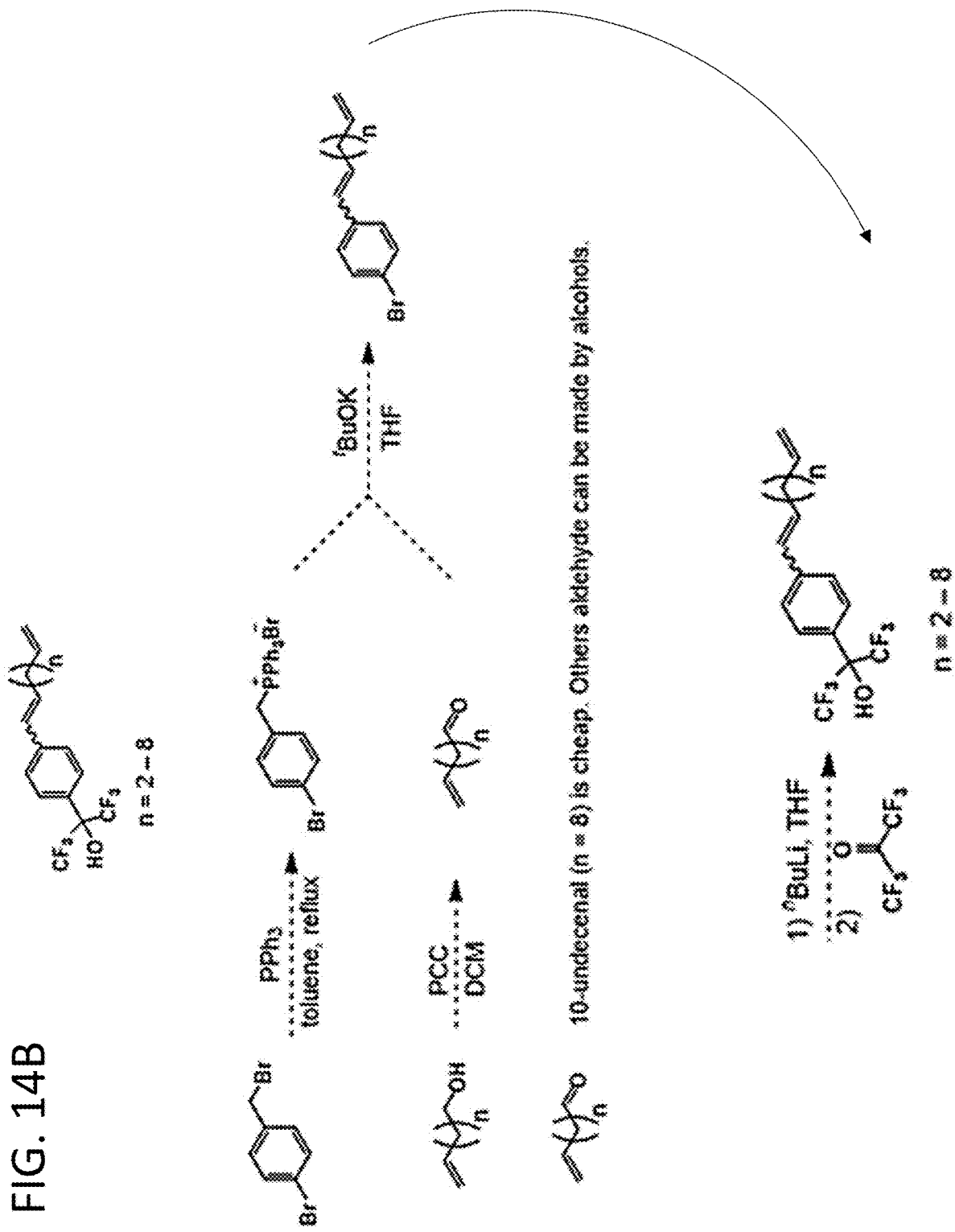
FIGS. 14B and 14C show illustrative reaction schemes for synthesizing other illustrative stabilizing chain transfer agents.
Figure 14C:
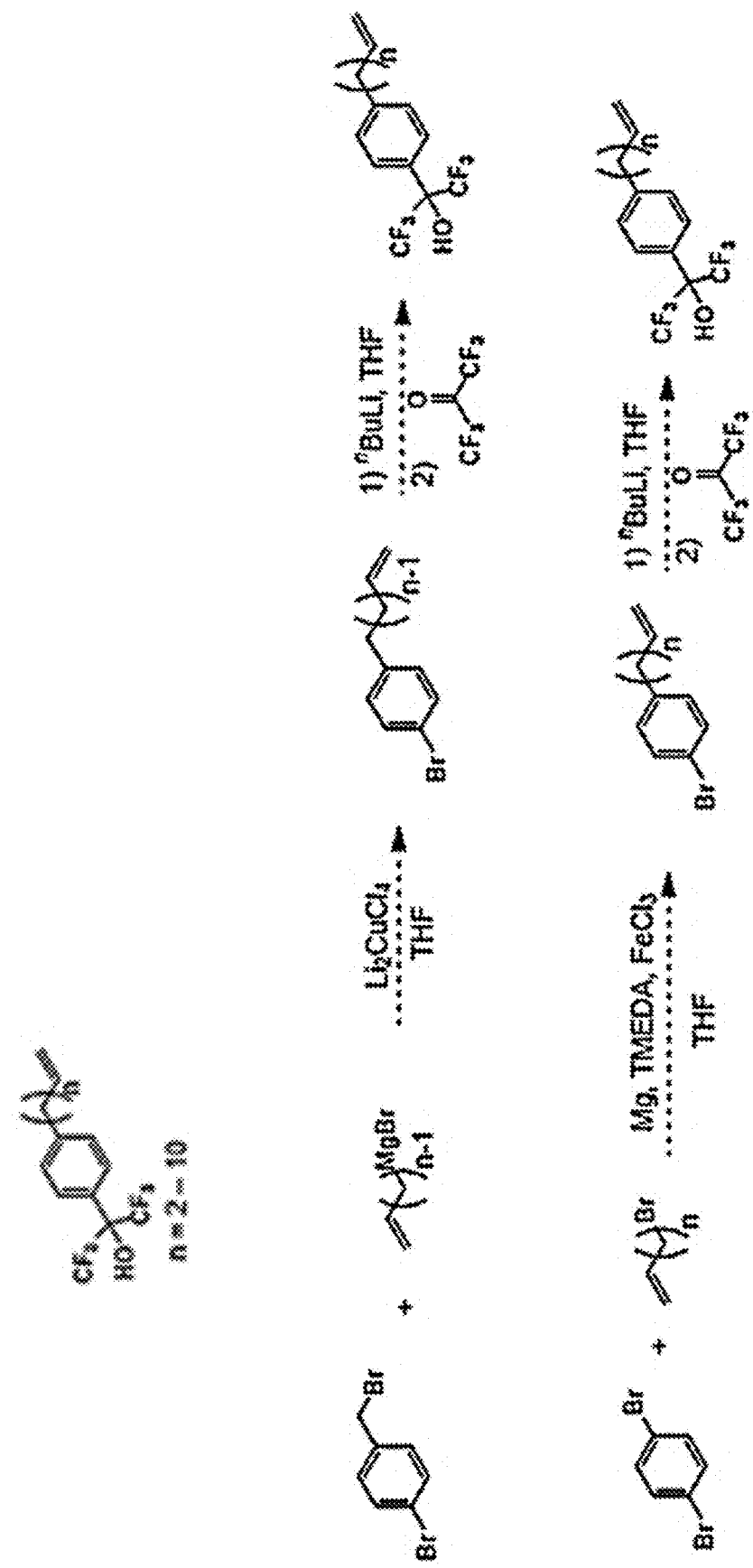

Regarding the chain transfer moiety, this may be derived from any of the chain transfer agents described herein. However, in embodiments, the chain transfer moiety is derived from a terminal olefin such as a linear terminal olefin. FIG. 6 shows an illustrative stabilizing chain transfer agent comprising a stabilizing moiety, a linking moiety, and a chain transfer moiety. As shown in FIG. 6, n may range from 2 to 9. This also includes n being 3, 4, 5, 6, 7, and 8. Other illustrative stabilizing chain transfer agents are shown in FIGS. 14B and 14C. Known synthetic techniques may be used to form such stabilizing chain transfer agents. For example, FIG. 14A shows an illustrative reaction scheme for synthesizing the stabilizing chain transfer agent of FIG. 6. Illustrative reaction schemes for synthesizing the other illustrative stabilizing chain transfer agents are shown in FIGS. 14B and 14C.

In embodiments, the stabilizing reactant is a stabilizing chain transfer agent having Formula III, $R_3C(OH)CX_3$—$(CH_2)_n$—$CH_2$=$CH_2$. In Formula III, $R_3$ is hydrogen or an alkyl group; X is a halogen; and n is an integer from 2 to 9. In embodiments of Formula II, one or more of the following may apply: $R_3$ is hydrogen, $CH_3$, or $CX_3$; and X is F.

As noted above, the stabilizing reactant may be included in any of the disclosed reactant compositions in addition to its corresponding reactant. For example, the reactant composition may comprise any of the disclosed strained cyclic unsaturated monomers and an amount of any of the disclosed stabilizing strained cyclic unsaturated monomers. An amount of the stabilizing reactant may be used such that the total amount of the stabilizing reactant and its corresponding reactant is within the amounts of the corresponding reactants described above. By way of illustration, the reactant composition may include a ratio of reactant (i.e., unfunctionalized) to stabilizing reactant of from 5:1 to 100:1. This includes, e.g., from 10:1 to 80:1 and from 30:1 to 60:1. In embodiments, the stabilizing reactant completely replaces its corresponding reactant. For example, the reactant composition may comprise any of the disclosed stabilizing strained cyclic unsaturated monomers while being free of (i.e., not comprising) any of the disclosed strained cyclic unsaturated monomers (i.e., unfunctionalized).

In embodiments, the reactant composition comprises a stabilizer, a strained cyclic unsaturated monomer, an initiator, a mediator, and optionally, one or more of a co-monomer, a crosslinker, and a chain transfer agent. In a variation, a portion, or all, of the strained cyclic unsaturated monomer is replaced by a stabilizing strained cyclic unsaturated monomer. In a variation, a portion, or all, of the chain transfer agent is replaced by a stabilizing chain transfer agent. In a variation, the reactant composition is free of a solvent. Any of these variations may be combined without limitation.

In embodiments, the reactant composition comprises a stabilizing strained cyclic unsaturated monomer, an initiator, a mediator, and optionally, one or more of a co-monomer, a crosslinker, and a chain transfer agent. In a variation, a portion, or all, of the chain transfer agent is replaced by a stabilizing chain transfer agent. In a variation, the reactant composition is free of a solvent. Any of these variations may be combined without limitation.

In embodiments, the reactant composition comprises a stabilizing strained cyclic unsaturated monomer, an initiator, a mediator, a stabilizing chain transfer agent, and optionally, one or more of a co-monomer, and a crosslinker. In a variation, the reactant composition is free of a solvent.

The reactant compositions may be made by mixing the components at desired relative amounts. The relative amounts may be adjusted to facilitate polymerization, to achieve certain properties of the polymer, etc.

Methods

Also provided are methods of forming a polymer using any of the disclosed reactant compositions. The methods comprise exposing any of the disclosed reactant compositions to conditions sufficient to induce ring-opening of the strained cyclic unsaturated monomer (or the stabilizing strained cyclic unsaturated monomer or both) and chain propagation to form a polymer therefrom. The conditions to induce polymerization include application of some form of energy, e.g., irradiation with light. Various wavelengths of light may be used, e.g., depending upon the mediator. For example, the light may comprise a wavelength in the ultraviolet (UV) portion (e.g., from 250 nm to 350 nm) of the electromagnetic spectrum or a wavelength in the visible portion (e.g., from 350 nm to 750 nm) of the electromagnetic spectrum. Other conditions to induce the polymerization include the temperature, time, relative amounts of reactants, etc. Illustrative conditions are provided in the Examples below. Other conditions may be applied as described any of the references listed above.

The methods may be carried out on any additive manufacturing system configured to fabricate objects, including two-dimensional (2D) and three-dimensional (3D) objects based on digital data representing the object. Using such a system, the digital data is broken down into a 2D cross-section (or series thereof) and the object is fabricated in a layer-by-layer fashion. The additive manufacturing system may be a stereolithographic system in which any of the disclosed reactant compositions in a vat is selectively cured (polymerized) via light. The Examples, below, describe the use of a stereolithographic system to fabricate various objects from illustrative reactant compositions. Any of the additive manufacturing systems (and methods for operating the systems) described in U.S. Pat. Publication No. 20200406539, which is hereby incorporated by reference in its entirety, may be used.

Objects fabricated by the present methods need not be (although they can be) subjected to any desired post-processing steps. In embodiments, the object fabricated by the present methods is fully cured, e.g., greater than 95% of the material of the object has been converted into an insoluble, intractable, solid form. In other words, the object's gel fraction is greater than 95%. In other embodiments, the object fabricated by the present methods is partially cured and may be subjected to a post-curing step, e.g., additional light irradiation or heating in an oven. However, in such embodiments, the partially cured object may have fixity, meaning the curing has been sufficient to allow the partially cure object to freely stand under its own weight without deforming.

Polymers and Objects Formed Therefrom

The present disclosure also encompasses the polymers and polymeric objects formed using any of the disclosed reactant compositions. Such polymers/objects may be characterized, in part, by the presence of an amount of any of the disclosed stabilizers and/or stabilizing reactants. The polymer may be identified as the polymerization product of reactants comprising the strained cyclic unsaturated monomer (which may be a stabilizing strained cyclic unsaturated monomer), and optionally, one or more of the co-monomer and the crosslinker. The morphology and type of object is not particularly limited, but may include automotive parts, wind turbine blades, and a wide variety of other industrial and consumer parts. The composition of polymers formed from illustrative reactant compositions are shown in FIGS. 7, 8A-8C, 10, and FIG. 9 shows an illustrative 3D object fabricated from an illustrative reactant composition.

EXAMPLES

Example 1

Figure 7:
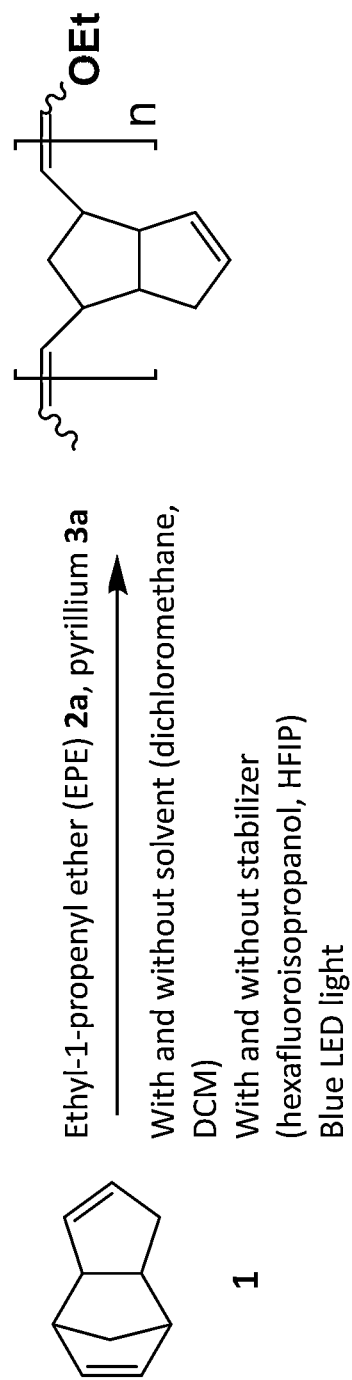
FIG. 7 shows a reaction scheme for illustrative reactant compositions.

Various reactant compositions were prepared by combining DCPD (1), ethyl-1-propenyl ether (EPE) (2a), a pyrylium mediator (3a, "pc" in Table 1), and hexafluoroisopropanol (HFIP) as a stabilizer. In some reactant compositions, a solvent (dichloromethane, DCM) was also included (samples 1-3) but in others, no solvent was included (samples 4-6). In the comparative compositions, no HFIP was included (samples 1, 3, and 4). The reaction scheme using these reactant compositions is generally illustrated in FIG. 7. The reactant compositions were exposed to conditions to induce polymerization via MF-ROMP as shown in Table 1, below. In Table 1, conversion was determined by NMR spectroscopy. The theoretical molecular weight $M_{n,theo}$, was calculated by monomer conversion and initial monomer to initiator loading ratio. The weight average molecular weight $M_{w,exp}$, number average molecular weight $M_{n,exp}$, and dispersity, Đ were measured by permeation chromatography (GPC) using multi-angle light scattering (MALS) and refractive index (RI) detection. The initiation efficiency $f$ was calculated from $M_{n,theo}/M_{n,exp}$.

TABLE 1

MF-ROMP Using Various Reactant Compositions.

| Sample | Temp. (° C.) | Time (h) | DCPD Isomer | Solvent | [DCPD] (M) | DCPD:HFIP: EPE:pc (mole equivalents) | Conversion (%) | $M_{n,exp}$ (kDa) | $M_{w,exp}$ (kDa) | Đ | f (%) |
|---|---|---|---|---|---|---|---|---|---|---|---|
| 1 (Comparative) | 3 | 1 | Endo | DCM | 0.88 | 50:0:1:0.07 | 70 | 8.89 | 13.5 | 1.5 | 53 |
| 2 | 3 | 1 | Endo | DCM + HFIP | 0.86 | 50:10:1:0.07 | 81 | 11.3 | 21.1 | 1.9 | 47 |
| 3 (Comparative) | 22 | 1 | Endo | DCM | 0.88 | 50:0:1:0.07 | 41 | 4.67 | 6.52 | 1.4 | 60 |
| 4 (Comparative) | 22 | 1 | Endo | no solvent | 7.28 | 50:0:1:0.05 | 0 | — | — | — | — |
| 5 | 22 | 1 | Endo | HFIP | 5.03 | 10:5:1:0.05 | 56 | 2.05 | 4.94 | 2.4 | 36 |
| 6 | 22 | 1 | Exo | HFIP | 5.03 | 10:5:1:0.05 | 76 | 1.68 | 3.50 | 2.1 | 56 |

The results establish that the use of the stabilizer HFIP unexpectedly increases conversion from 70% (comparative sample 1) to 81% (sample 2). The results further establish that small amount of stabilizer (HFIP) additive enables solvent less polymerization (samples 5 and 6) whereas no polymerization occurs in the absence of any HFIP and DCM (comparative sample 4).

Example 2

Top-down vat polymerization of various reactant compositions were carried out using a ViewSonic Projector (PA503S). The distance between the light and the sample was 11.5 cm. The sample was irradiated from the top. The temperature was room temperature. A vial was coated with polydimethylsiloxane (PDMS) and covered with a glass slide to provide the vat. The reactant composition was floated on top of Krytox GPL 107 oil. A stainless-steel build plate was used.

Figure 8A:
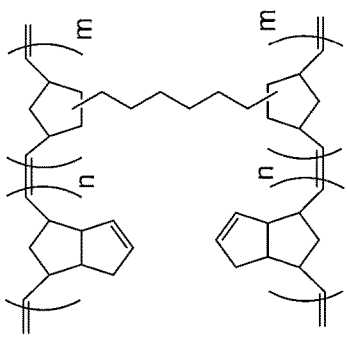
FIGS. 8A-8C show reaction schemes for illustrative reactant compositions.
Figure 8A:
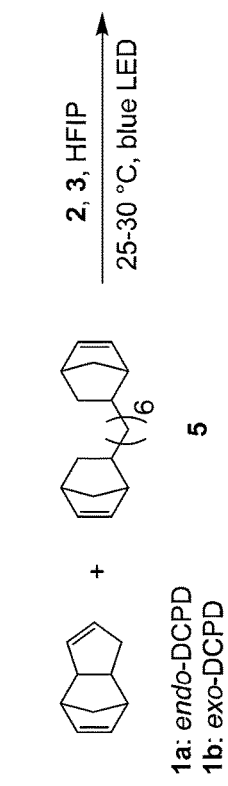
Figure 8B:
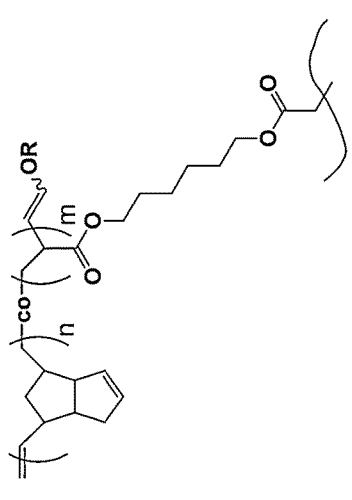
Figure 8B:
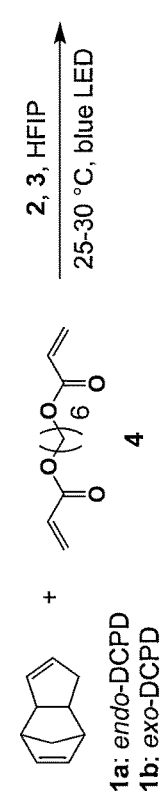
Figure 8C:
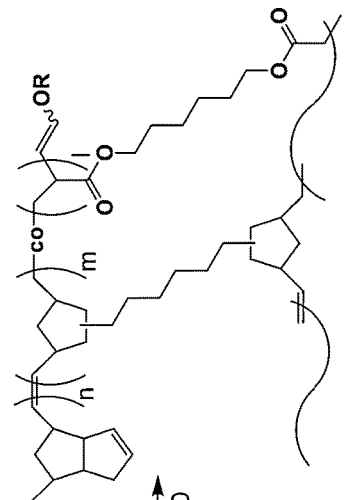
Figure 8C:
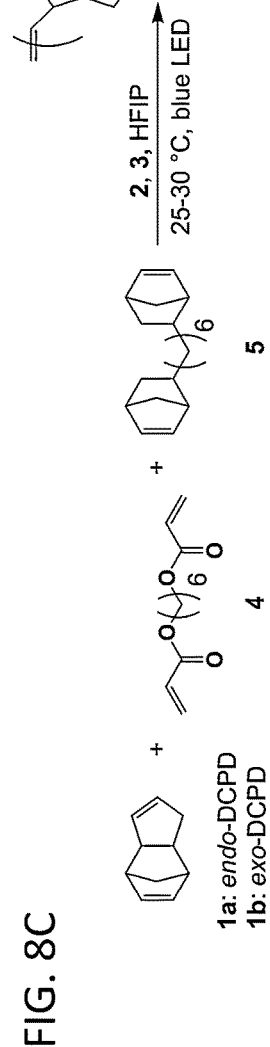
Figure 9:
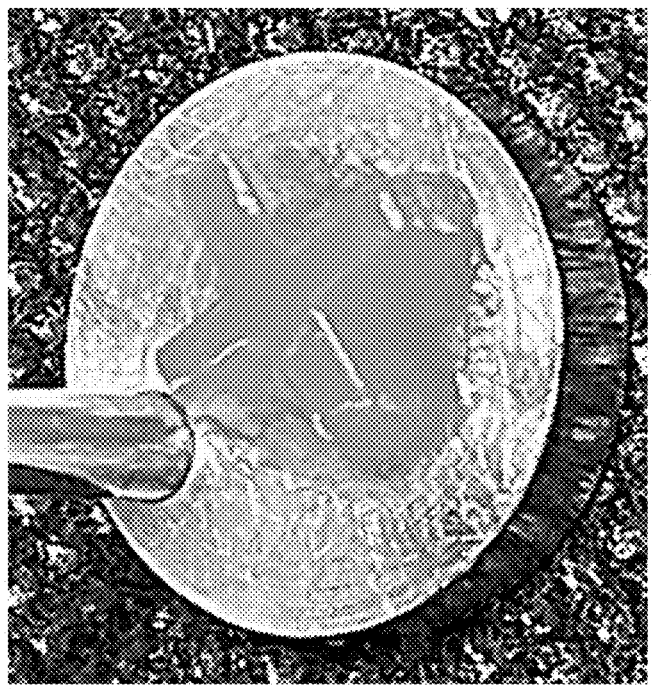
FIG. 9 shows a 3D object fabricated from an illustrative reactant composition.

The various reactant compositions were prepared by combining DCPD (1), various initiators (2a-2f), various pyrylium mediators (3a-3b), various crosslinkers (4, 5), and HFIP as a stabilizer. No solvent was included. Illustrative reaction schemes are illustrated in FIGS. 8A-8C. Other fabrication conditions are shown in Tables 2-4, below. An illustrative 3D object is shown in FIG. 9.

TABLE 2

3D Fabrication and Bulk MF-ROMP Polymerization Using Various Reactant Compositions.

|  | Sample 7 | Sample 8 |
|---|---|---|
| DCPD:HDDA (crosslinker):HFIP:2:3b (mole ratio, i.e., equivalents) | 20:5:3.5:1:0.01 (2 = 2a) | 19.2:4.8:4.5:1:0.01 (2 = 2c) |
| Layer Speed | 0.1 mm/10 min | 0.1 mm/10 min |
| Number of Layers | 4 | 10 |
| Thickness (average, mm) | 0.29 | 1.18 |

TABLE 3

3D Fabrication and Bulk MF-ROMP Polymerization Using Various Reactant Compositions.

|  | Sample 9 | Sample 10 | Sample 11 |
|---|---|---|---|
| 2c:2e | 100:0 | 8.9:1 | 9.5:1 |
| DCPD:HDDA (cros slinker): HFIP: (2c + 2e) :3b (mole ratio, i.e., equivalents) | 19.2:4.8: 4.5:1:0.01 | 19.8:5.0: 4.7:1:0.01 | 19.3:4.8: 3.4:1:0.01 |
| Layer Speed | 0.1 mm/ 10 min | 0.1 mm/ 10 min | 1$^{st}$ layer: 0.1 mm/10 min 2-9 layers:0.1 |

TABLE 3-continued

3D Fabrication and Bulk MF-ROMP Polymerization Using Various Reactant Compositions.

|  | Sample 9 | Sample 10 | Sample 11 |
|---|---|---|---|
|  |  |  | mm/5 min |
| Number of Layers | 10 | 8 | 10 |
| Thickness (average, mm) | 1.18 | 1.20 | 0.96 |

TABLE 4

3D Fabrication and Bulk MF-ROMP Polymerization Using Various Reactant Compositions.

|  | Sample 12 | Sample 13 |
|---|---|---|
| 2d:2f | 8.4:1 | 8.4:1 |
| DCPD:HDDA (crosslinker):HFIP:(2d+2f):(3a+3b) (mole ratio, i.e., equivalents) | 19.8:4.9:3.4:1:0.014 | 19.7:4.9:3.4:1:0.014 |
| Layer Speed | 1$^{st}$ layer: 0.1 mm/10 min 2-30 layers:0.1 mm/3 min | 1$^{st}$ layer: 0.1 mm/10 min 2-10 layers: 0.1 mm per 4, 3, 2, 1 min, respectively |
| Number of Layers | 30 | 10 |
| Thickness (average, mm) | 2.79 | 1.25, 1.19, 0.78, 0.89 |

Example 3

Figure 10:
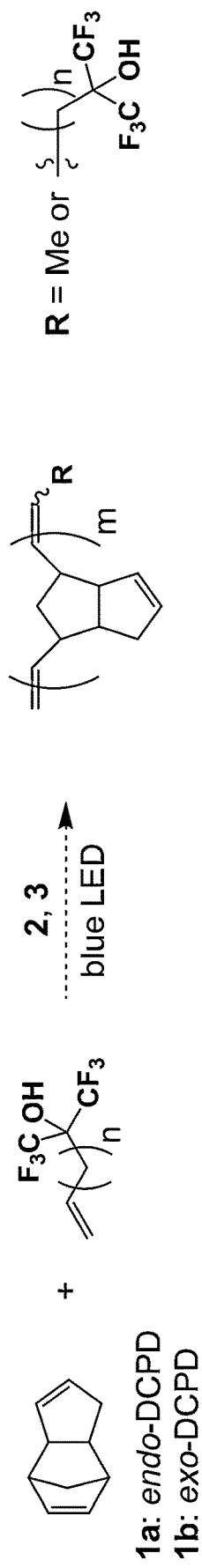
FIG. 10 shows a reaction scheme for an illustrative reactant composition comprising a stabilizing chain transfer agent.

The stabilizing chain transfer agent of FIG. 6 will be prepared. Various reactant compositions will be prepared comprising this stabilizing chain transfer agent. Polymers and objects will be formed as described in Examples 1 and 2. An illustrative reaction scheme is shown in FIG. 10.

Example 4

Figure 11:
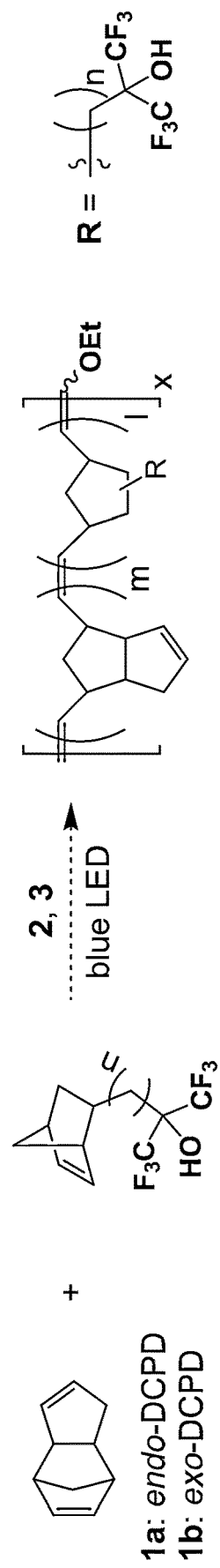
FIG. 11 shows a reaction scheme for an illustrative reactant composition comprising a stabilizing monomer.

The stabilizing strained cyclic unsaturated monomer of FIG. 5 will be prepared. Various reactant compositions will be prepared comprising this stabilizing strained cyclic unsaturated monomer. Polymers and objects will be formed as described in Examples 1 and 2. An illustrative reaction scheme is shown in FIG. 11.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A reactant composition for forming a polymer via metal-free ring-opening metathesis polymerization, the composition comprising:
   (a) one or more of:
       a stabilizer having Formula I

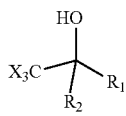

wherein $R_1$ and $R_2$ are independently selected from a hydrogen, an alkyl group, a phenyl group, and an alkenyl group and X is a halogen, and further wherein the stabilizer is a secondary halogenated alcohol other than hexafluoroisopropanol or the stabilizer is a tertiary halogenated alcohol;
       a stabilizing monomer having Formula II, $HOCR_3(CX_3)$—$(CH_2)_n$-M, wherein $R_3$ is hydrogen or an alkyl group; X is a halogen; n is an integer from 2 to 9; and M is a strained cyclic unsaturated monomer; and
       a stabilizing chain transfer agent having Formula III, wherein the stabilizing chain transfer agent has Formula III, $R_3C(OH)CX_3$—$(CH_2)_n$—$CH_2$=$CH_2$, wherein $R_3$ is hydrogen or an alkyl group; X is a halogen; and n is an integer from 2 to 9;
   (b) a strained cyclic unsaturated monomer;
   (c) an initiator;
   (d) a mediator; and
   (e) optionally, one or more of a co-monomer, a cross-linker, and a chain transfer agent.

2. The reactant composition of claim 1, wherein in Formula I X is F; $R_1$ is hydrogen, $CF_3$, or $CH_3$; and $R_2$ is hydrogen, $CF_3$, $CH_3$, a phenyl group, a linear alkenyl group, or a branched alkyl group;
   further wherein in Formula II, $R_3$ is hydrogen, $CH_3$, or $CX_3$; X is F; and M is norbornene; and
   further wherein in Formula III, $R_3$ is hydrogen, $CH_3$, or $CX_3$; and X is F.

3. The reactant composition of claim 1, comprising the stabilizing monomer.

4. The reactant composition of claim 1, comprising the stabilizing chain transfer agent.

5. A method of forming a polymer using the reactant composition of claim 1, the method comprising exposing the reactant composition to conditions sufficient to induce ring-opening of the strained cyclic unsaturated monomer and chain propagation to form a polymer therefrom.

6. A reactant composition for forming a polymer via metal-free ring-opening metathesis polymerization, the composition comprising:
   (a) a stabilizer wherein the stabilizer is a halogenated alcohol and the halogenated alcohol is a secondary halogenated alcohol other than hexafluoroisopropanol or the halogenated alcohol is a tertiary halogenated alcohol;
   (b) a strained cyclic unsaturated monomer;
   (c) an initiator;
   (d) a mediator; and
   (e) optionally, one or more of a co-monomer, a cross-linker, and a chain transfer agent.

7. The reactant composition of claim 6, wherein the secondary halogenated alcohol is a secondary fluorinated alcohol and the tertiary halogenated alcohol is a tertiary fluorinated alcohol.

8. The reactant composition of claim 7, wherein the halogenated alcohol is the tertiary fluorinated alcohol.

9. The reactant composition of claim 8, wherein the tertiary fluorinated alcohol is selected from perfluoropinacol; 1,3-bis(1,1,1,3,3,3-hexafluoro-2-hydroxypropyl)benzene; perfluoro-tert-butanol; 1,1,1,3,3,3,-hexafluoro-2-methyl-2-propanol; 2-trifluoromethyl-2-propanol; and 1,1,1,3,3,3-hexafluoro-2-phenyl-2-propanol; and combinations thereof.

10. The reactant composition of claim 1, wherein the reactant composition is free of a solvent.

11. The reactant composition of claim 6, wherein the reactant composition is free of a solvent.

* * * * *